(12) United States Patent
Hensel et al.

(10) Patent No.: US 10,946,315 B2
(45) Date of Patent: Mar. 16, 2021

(54) FILTER APPARATUS

(71) Applicant: Putsch GmbH & Co. KG, Hagen (DE)

(72) Inventors: Rainer Hensel, Iserlohn (DE); Rudolf Schick, Hagen (DE); Benedikt Soeder, Hagen (DE)

(73) Assignee: PUTSCH GMBH & CO. KG, Hagen (DE)

( * ) Notice: Subject to any disclaimer, the term of this patent is extended or adjusted under 35 U.S.C. 154(b) by 469 days.

(21) Appl. No.: 15/654,333

(22) Filed: Jul. 19, 2017

(65) Prior Publication Data

US 2018/0021704 A1 Jan. 25, 2018

(30) Foreign Application Priority Data

Jul. 21, 2016 (DE) .......................... 102016113440.6

(51) Int. Cl.
*B01D 29/085* (2006.01)
*B01D 29/94* (2006.01)
(Continued)

(52) U.S. Cl.
CPC ....... *B01D 29/085* (2013.01); *B01D 21/0024* (2013.01); *B01D 24/44* (2013.01);
(Continued)

(58) Field of Classification Search
None
See application file for complete search history.

(56) References Cited

U.S. PATENT DOCUMENTS 3,356,215 A * 12/1967 Miles, Jr. ............. B01D 29/114
210/798
3,530,989 A * 9/1970 Koethke .............. B01D 29/114
210/188
(Continued)

FOREIGN PATENT DOCUMENTS

| DE | 7831204 U | 4/1979 |
|---|---|---|
| DE | 3238783 A | 7/1983 |
| DE | 9011918 U | 12/1990 |

OTHER PUBLICATIONS

Matusch et al., "Machine Translation of DE2140159", published 1973, 20 total pages. (Year: 1973).*
(Continued)

*Primary Examiner* — Jonathan M Peo
(74) *Attorney, Agent, or Firm* — Andrew Wilford (57) ABSTRACT

An apparatus for filtering a suspension has a housing with an inlet receiving the suspension to be filtered, an outlet for the clear filtered filtrate, and a drain for removal of filter cake. The housing has a cylindrical part centered on an axis. An output ring pipe is connected to the outlet and externally surrounds the cylindrical part. A plurality of segmental filter holders are fittable into the cylindrical part from above and together form a circular insert with each holder forming an inlet chamber having an outflow fitting connectable to the annular output pipe. Respective sets of filter elements each formed by a respective strip-shaped support and a mesh filter sock surrounding the support are carried on the holder and open into the respective inlet chambers. A removable cover upwardly closes the cylindrical part above the inserts.

16 Claims, 10 Drawing Sheets

(51) Int. Cl.
  *B01D 29/52* (2006.01)
  *B01D 29/11* (2006.01)
  *B01D 21/00* (2006.01)
  *B01D 24/44* (2006.01)
  *B01D 25/32* (2006.01)
  *B01D 29/00* (2006.01)
  *C13B 20/16* (2011.01)

(52) U.S. Cl.
  CPC ............ *B01D 25/32* (2013.01); *B01D 29/114* (2013.01); *B01D 29/52* (2013.01); *B01D 29/94* (2013.01); *B01D 29/009* (2013.01); *B01D 2201/0446* (2013.01); *C13B 20/16* (2013.01)

(56) References Cited

U.S. PATENT DOCUMENTS

| | | | | |
|---|---|---|---|---|
| 4,525,274 A | * | 6/1985 | Willus | ............... B01D 29/114 210/232 |
| 4,604,201 A | * | 8/1986 | Muller | ............... B01D 29/15 210/323.2 |

OTHER PUBLICATIONS

Schulz,"Machine Translation of DE4215585", published 1993, 31 total pages. (Year: 1993).*

Junker, "Machine Translation of DE3238783", published 1983, 33 total pages. (Year: 1983).*

\* cited by examiner

FILTER APPARATUS

FIELD OF THE INVENTION

The present invention relates to a filter apparatus. More particularly this invention concerns an apparatus for filtering a sugar solution.

BACKGROUND OF THE INVENTION

A filter for separating suspensions, in particular sugar syrups, has a housing with an inlet to which the suspension to be filtered is supplied, an outlet from which the clear filtrate leaves the apparatus, and another outlet through which the filtrand or filter cake is discharged. The housing has a cylindrical upper part and a removable cover. The upper cylindrical part holds a plurality of filter elements that each are formed by a filter strip enclosed in a sock-like filter cloth.

Such filters, in particular for filtering a sugar syrup, are known in various forms in the state of the art and have proven successful per se. They typically use filter cartridges having an oval or circular cross section and consisting of a support made of metal and a filter sock pulled over the support. The unfiltered solution surrounds the filter cartridge, passes inward through the mesh of the filter cloth that holds back any particles above a certain size in the solution, and the filtered solution or filtrate is withdrawn from inside the filter element/cartridge.

Such filter cartridges are known from German Utility Model 78 31 204, DE 32 49 756, and from German Utility Model G 90 11 918, that all have a flat circular or oval cross section.

All these filters separate the particle-carrying suspension into a clear filtrate and a thickened sludge, also referred to as a filter cake. To achieve the most uniform possible flow distribution of the suspension in the housing, it is known that at least one essential part of the housing in which the filter elements are situated may be designed to be cylindrical.

The filter performance, that is the amount of filtrate to be achieved per unit of time depends to a significant extent on the filter area per unit of volume. This means that with a uniform volume and an increase in filter area the yield of clear filtrate also increases. The distance between the stretched filter cloths is not variable because the distance is important and necessary for the shape of the filter cake during filtration as well as for a subsequent removal in cleaning and/or rinsing the filter.

OBJECTS OF THE INVENTION

It is therefore an object of the present invention to provide an improved filter apparatus.

Another object is the provision of such an improved filter apparatus that overcomes the above-given disadvantages, in particular that is improved with regard to operation, maintenance and filter performance, such that the filter area is increased significantly per unit of volume, and the filter apparatus also has a particularly long lifetime while being relatively simple to manufacture.

SUMMARY OF THE INVENTION

An apparatus for filtering a suspension has according to the invention a housing with an inlet receiving the suspension to be filtered, an outlet for the clear filtered filtrate, and a drain for removal of filter cake. The housing has a cylindrical part centered on an axis. An output ring pipe is connected to the outlet and externally surrounds the cylindrical part. A plurality of segmental filter holders are fittable into the cylindrical part from above and together form a circular insert with each holder forming an inlet chamber having an outflow fitting connectable to the annular output pipe. Respective sets of filter elements each formed by a respective strip-shaped support and a mesh filter sock surrounding the support are carried on the holder and open into the respective inlet chambers. A removable cover upwardly closes the cylindrical part above the inserts.

Thus the invention is an apparatus for filtering a suspension, in particular for filtering sugar syrups, in which a plurality of filter elements each consisting of a filter element with a filter cloth that is stretched over the filter element and encloses it, are disposed on a segmental filter holder. The segmental filter holders supplement one another in a circular insert which covers approximately the entire circular surface of the cylindrical part of the housing. Each segmental filter holder has an inlet chamber for the filtrate flowing out of the filter elements. Each inlet chamber in turn has an outflow fitting for filtrate, wherein all the outflow fittings of all the segmental filter holders and/or their inlet chambers are connected to a ring line surrounding the housing on the outside. From this ring line, the collected filtrate of all the segmental filter holders can be discharged to a connected receiving device. In the operating position of the filter, the upper insert opening of the housing in which the segmental filter holders are situated is sealed by the cover. The segmental filter holders are shaped like a piece of pie. They each consist of a plurality of approximately rectangular filter elements with filter cloths, each forming a filter element, thus being disposed parallel to one another inside a segmental filter holder shaped like a piece of pie.

The pie-shaped segmental filter holders can be removed from the housing quickly and easily as needed by loosening and pulling them upward and out and replaced by a similar pie-shaped segment. Thus, for example, in the event of damage to individual filter elements, a repair can be made particularly quickly and easily by removing only a single segment from the filter and replacing it. All the other segments that have not been damaged remain within the housing during this replacement. Such a replacement may also be necessary, for example when the filter performance of a single segment-type pie-shaped filter holder declines relative to that of the other segmental filter holders which may occur for example in the case of blockage of the filter cloth and/or of a plurality of filter cloths.

The inlet is formed by a pipe passing through the housing wall beneath the segmental filter holder and opening centrally in the cylindrical part of the housing at the segmental filter holder, so that a particularly good and uniform distribution of the suspension in the filter is ensured This is additionally facilitated in particular in that the longitudinal side surfaces of each filter element extend in a parallel to the radial central plane of the respective segmental filter holder. This permits the flow and thus the distribution of the suspension supplied in the filter in a direction of flow extending approximately radially outward. Due to this approximately radial flow, there is an optimal distribution of the suspension in the filter housing which thus increases the filter performance of the filter.

The number of segmental filter holders which together form a circular insert may be 4, 6, 8, 10 or 12. In practice, 6 has proven especially suitable.

It has also proven particularly suitable in practice that each segmental filter holder has four rows of filter elements disposed side by side. The outermost first row and the second row next to it each have 16 parallel filter elements parallel to one another, while the third row has twelve filter elements and the fourth row closer to the center have six filter elements. Due to this particularly large number of filter elements that extend in rows side by side within the respective segmental filter holder, a particularly large filter area is achieved, based on the volume of the cylindrical part of the housing of the filter. The filter performance is thus also extremely high due to such an arrangement so that a particularly large amount of clear filtrate can be filtered out of the suspension supplied to it within an extremely short period of time.

As an additional means for increasing the filter performance, each filter element is of approximately rectangular shape and consists of a holder and a double-slotted metal support plate fixed to the respective holder. The double-slotted metal plate is designed to be flat and flexible and is covered by a filter cloth. Due to the use of a flat and flexible double-slotted metal plate as the filter element, a particularly productive flow of filtrate through by the filter cloth that in this case is a filter sock is made possible toward the double-slotted metal plate. Due to its flexible design, the double-slotted metal plate is optionally yielding and does not present a rigid obstacle in particular at those locations where pressure increases. Therefore, a particularly large amount of filtrate discharge is made possible at any time.

To discharge the filtrate flowing off the filter element on the segmental filter holder, the holder has outflow fittings at the top directed toward the filter holder and outflow fittings that open into the filter holder for the filtrate. This makes it possible to discharge the filtrate out of the filter element and into the segmental filter holder at any time. This is simplified and promoted in particular by the fact that, after filtration through the filter cloth, the filtrate inside each filter element flows through the filter cloth then longitudinally along the filter element up to the outflow fittings in the holder out through the disconnectable piping to the ring pipe. This is more or less not decelerated and thus permits especially effective outflow of the filtrate out of the filter element and through the outflow fittings.

To enable a particularly simple and time-saving replacement, that is removal and reinsertion of a segmental filter holder, each segmental filter holder has support elements running approximately parallel to the filter elements such as for example support rods. In the installed position, the support rods are supported on corresponding support areas that are optionally guided on the housing inside and/or on the inlet pipe forming the central longitudinal axis and are optionally also guided in the correct position thereon. Thus a segmental filter holder can be removed by lifting it approximately vertically out of the housing and inserting it back into the housing in the opposite direction. For correct positioning, the support regions are formed on the inside wall of the housing and/or on the inlet pipe forming the central longitudinal axis. In the inlet, the support rods may be guided by the support regions that may also be formed by eyes or similar guides, for example, so that a supply in the correct position can be ensured at any time.

The segmental filter holders have an approximately triangular base shape, with the support elements or support rods being in the corners of the triangle.

For simplified handling and in particular monitoring of the filtrate flowing out, a glass inspection window is provided in the outlet pipes, each of which is situated between the outlet opening of the segmental filter holder and the ring pipe running peripherally and externally around the cylindrical part of the housing outside of the housing. Due to the fact that such an inspection window is provided on each segmental filter holder at its outlet, an operator can see the filtrate through the inspection window at any time and can evaluate whether the filter performance is still adequate in this segment. In other words, after a damage incident or blockage, for example, the filtrate that is visible in the inspection window may have a certain degree of turbidity which notifies the operator that this segmental filter holder is no longer achieving the required filter performance.

To stop operation of an individual segmental filter holder, for example, a cutoff valve is located in each of the outlet pipes outside the housing, each of these pipes being disposed between the outflow fitting of the segmental filter holder and the central ring pipe running peripherally on the outside around the cylindrical part of the housing. Operation of this segment-type filter area may be stopped, for example, by an operator after inspection of the filtrate of the respective segmental filter holder by observation through the inspection window by simply turning off the flow at the cutoff valve. In this manner this segmental filter holder is no longer active and the filter can be operated at a reduced overall filter performance with the remaining additional segmental filter holders that are still providing an adequate filter performance. This makes it possible in a particularly simple manner to monitor the overall results of the filter. This means that by a simple glance at the inspection windows of all segmental filter holders, it is possible to deduce the quality of the filtrate.

A funnel-type lower part of on the housing extends downward from its cylindrical upper part end opposite the cover. The tip of the funnel here forms the closable outlet and/or the opening for discharge of filter cake. Since this funnel-type area is beneath the cylindrical area in the working position, the resulting filter cake can fall down into this funnel-type area even during operation. For cleaning and/or backwashing, this discharge opening may be opened and the collected filter cake can be removed from the discharge opening.

Each segmental filter holder has a pair of plates forming a respective inlet chamber. On the one hand, the plate is connected to the outlet openings of the holder of the filter element and/or the filter elements and, on the other hand, the base plate is connected indirectly to the outlet for the filter. For rapid and simple fastening of the holders of the filter elements on the segmental filter holder, the inlet chamber is penetrated by fasteners, in particular threaded bolts that project away from the holders of the filter elements at the head end. Thus, a filter element can be connected to the respective segmental filter holder and fastened to it in a particularly rapid and simple manner. To do so, it is necessary only for the threaded bolts that project upward from the holder of the filter element, to pass through the corresponding hole on the segmental filter holder and then be secured in place and thereby fastened, for instance with a nut atop the holder.

The invention thus is an apparatus for filtering a suspension, in particular for filtering sugar syrups having an improved arrangement of the filter elements inside the filter housing, in which no filter elements interfere with the flow of the suspension to be filtered through filter elements extending transversely to the direction of flow, for example. In addition, a filter according to the invention allows a particularly large filter area in relation to the volume. Due to this, the filter performance is greatly increased compared to known approaches before a maintenance-related replacement or a cleaning or backwashing, so that there can be a particularly inexpensive use of the filter in particular for filtering large quantities of supplied suspension without interruption.

The filtration takes place in that the suspension flows approximately centrally through the pipe forming the inlet in the region of the segmental filter holder in the cylindrical portion of the housing, where it opens and the suspension flows from there in an approximately radial direction along the longitudinal side faces of the filter elements. In doing so, the filtrate flows through the filter sock formed by a filter cloth sheathing each filter element and flowing then longitudinally along the filter support through the outlet openings of each holder of the filter element, then into the inlet chamber of the respective segmental filter holder. From this inlet chamber the filtrate can flow through the outflow fitting of the segmental filter holder into an outflow pipe on the outside around the housing in the manner of a ring pipe and then be fed out of it into a corresponding collecting container. To achieve a high filter performance, such filters have a heavy weight and a large size. Thus for example the diameter of the cylindrical portion of the housing may amount to approximately 3000 mm. A single filter element may have a length of 2500 mm, for example, and a width of approximately 240 mm. This yields a filter area of 1 m² per filter element. A segmental filter holder may have a mass of about 700 kg, for example. Thus such a segmental filter holder is much easier to remove from the housing than, for example, a circular filter element forming the entire filter area.

Backwashing and thus cleaning of the filter cloths to remove filter cake adhering to the filter cloth are initiated in the reverse direction of flow in the filtrate. In other words filtrate is passed through the holder toward the filter element and from the inside through the filter cloths toward the outside. Adhering filter cake falls off in the process and collects in the funnel-like region of the base of the housing. In the case of simultaneous opening of the closable drain on the filter tip and/or the discharge opening there, the filter cake can thus be forced out of the funnel-type region.

In addition, the cleaning may also be performed in a two-step process in which the discharge opening of the funnel-type region is opened in the first step and the filter cake falls out through the opening. Next, this discharge opening is closed again, and in a second step, the remaining filter cake and deposits adhering to the filter cloths can be removed during a cleaning operation through the actual feed on the side wall of the housing. To do so the system is acted upon by liquid under pressure on the outlet end of the segmental filter holder so that the filter cake being released can be removed from the actual inlet at the sides.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

The figures show an apparatus 1 for filtering a suspension, for example sugar syrup, and having a housing 2 with an inlet 3 for receiving the suspension to be filtered, a drain or outlet 4 for the filtered clear filtrate, and an additional drain or outlet 5 for discharging the filtrand or filter cake. A removable cover 6 upwardly closes an upper cylindrical part 14 of the housing 2. A plurality of filter elements 7 are held in the upper cylindrical part 14. The filter elements 7 each consist of a strip-type filter support 8 surrounded by a sock-type filter cloth 9.

According to the invention the filter elements 7 are attached in groups to identical segmental filter holders 10 that each form an inlet distribution chamber 11 for the filtrate flowing up and out of the filter elements 7. Here multiple filter holders 10 each carrying a set of filter elements 7 can be inserted into the housing 2 from the top and can be secured side by side in a horizontal plane side perpendicular to a vertical central axis A of the housing 2. The segmental filter holders 10 together form a circular insert. The inlet chambers 11 each have outflow fittings 12 for filtrate coming up out the respective filter elements 7 into a fitting 24' of a closable pipe connection 24. The outflow fittings 12 are connected indirectly, for example, by this pipe connection 24 to a ring pipe 13 that spacedly surrounds the housing 2 and is secured on it. The collected filtrate can be discharged out of the ring pipe 13 through the outlet 4 to an unillustrated receptacle or the like. The cover 6 in the operating position of the filtrate 1 upwardly closes the upper part 14 of the housing 2 and thereby seals the housing 2 from the environment. The pipe connection 24 includes the fitting 24' that can mate with the outflow fitting 12 on the holder 10. The two can slide together parallel to the axis A and be latched to form a water-tight connection.

Figure 7:
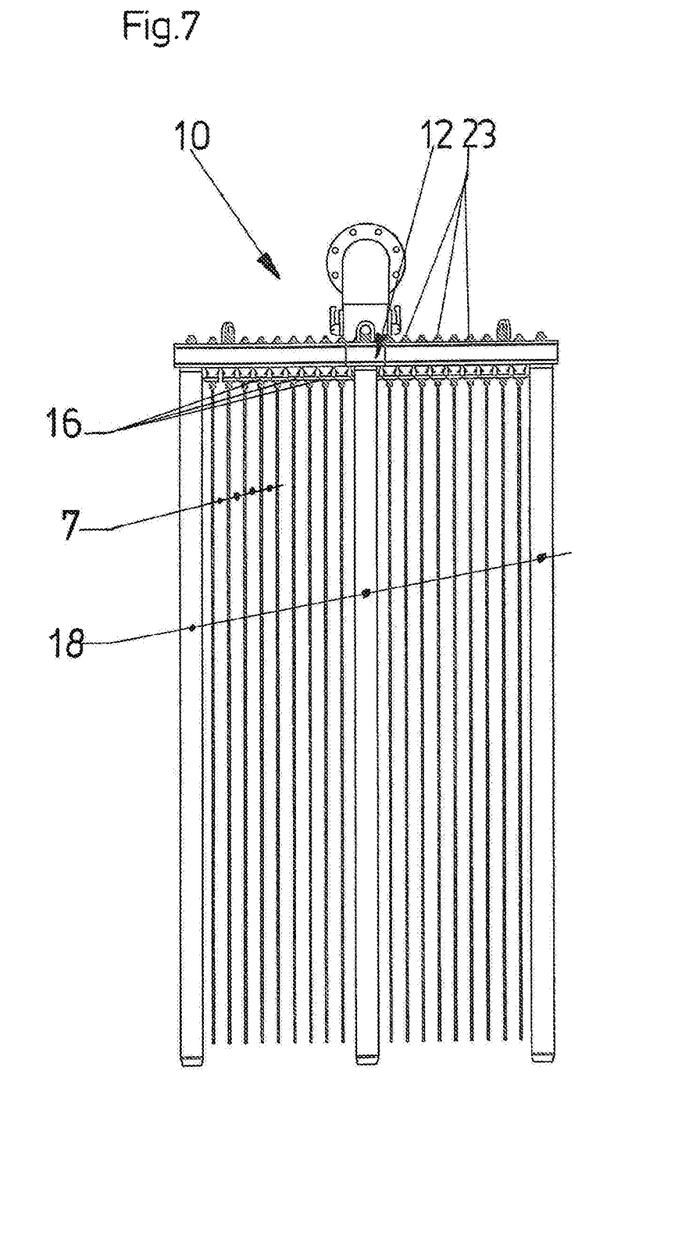
FIG. 7 is a side view of a segmental filter holder in a side view with filter elements.
Figure 8:
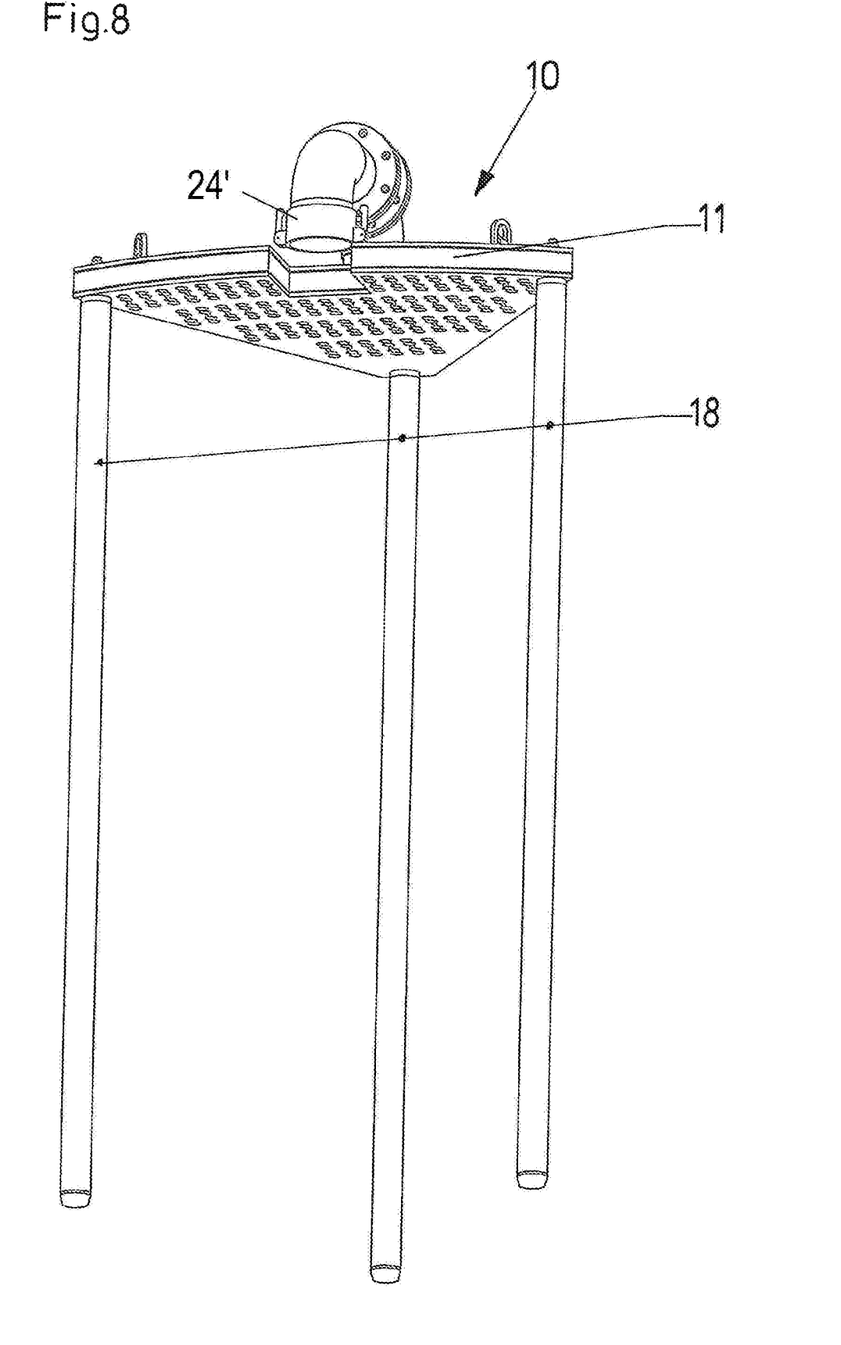
FIG. 8 shows the filter holder in a side view obliquely from below and without the filter elements.
Figure 9:
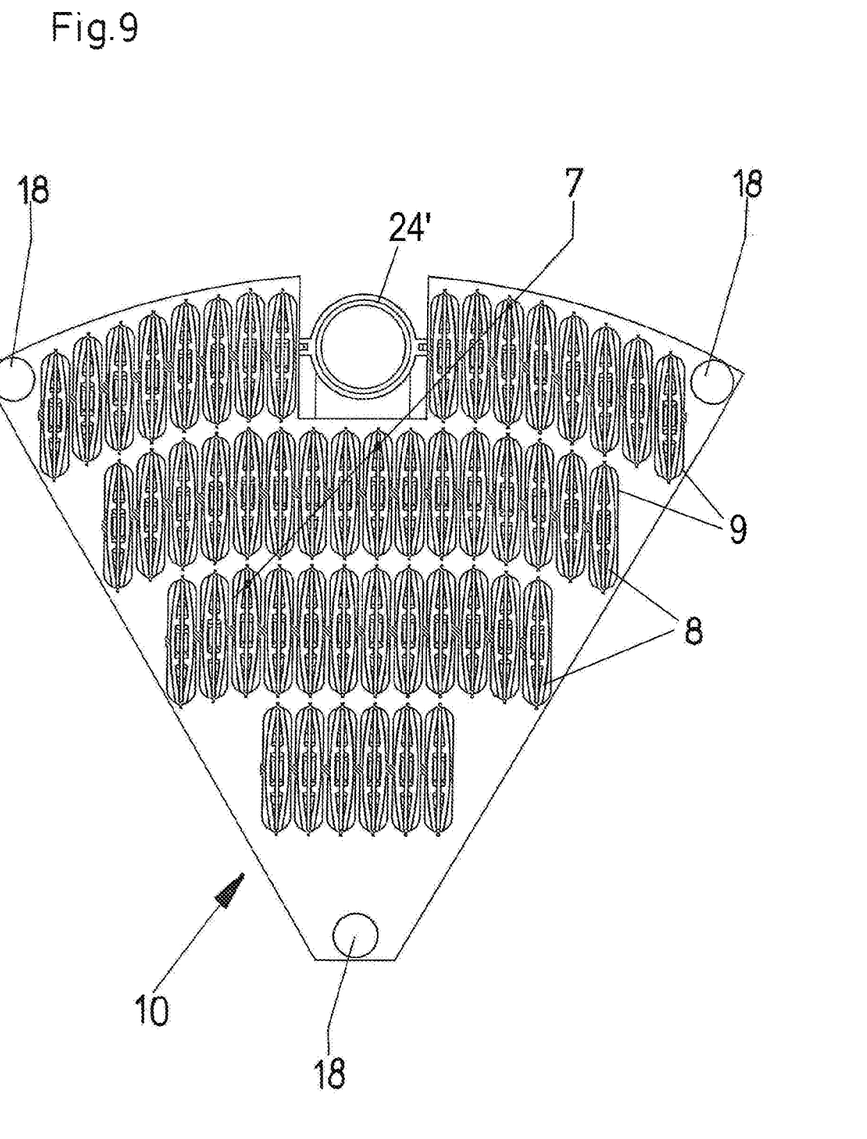
FIG. 9 is a bottom view of the segmental filter holder with filter elements.

In this embodiment, the segmental filter holders 10 are each shaped like a piece of pie. A plurality of basically rectangular filter elements 7 and their filter cloths 9 are carried on each pie-shaped segmental filter holder 10, the filter elements 7 being parallel to one another as can be seen from FIGS. 7 and 9. In this way, the suspension introduced through the inlet 3 of the housing 2 at 15 is distributed approximately centrally inside the housing 2 along the longitudinal side faces of each filter element 7 running approximately radially along the broad side faces of the filter elements 7 that do not decelerate and/or block flow of the suspension. This permits a particularly high filter performance, so that a large quantity of suspension can be filtered within a short period of time with such an arrangement according to the invention.

Figure 4:
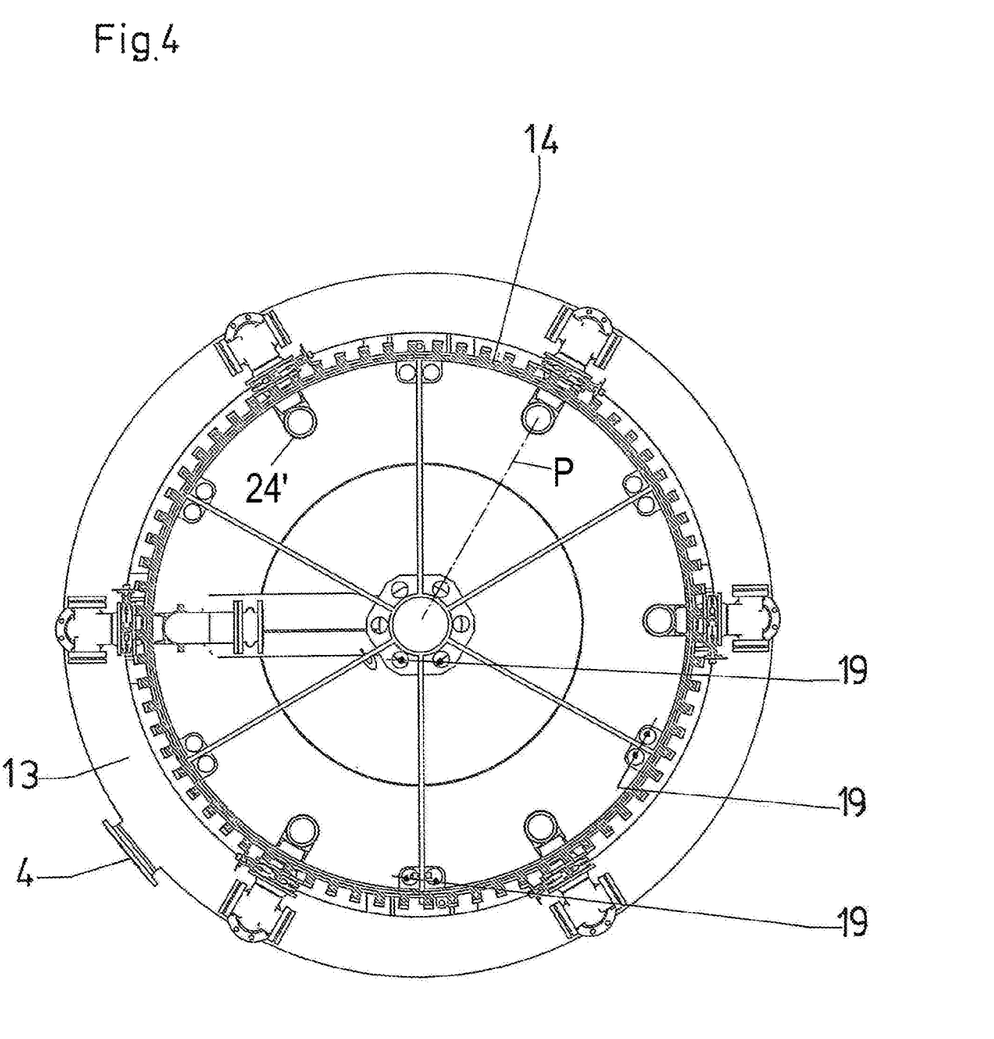
FIG. 4 is a top view of the housing without the cover or the segmental filter holders.
Figure 5:
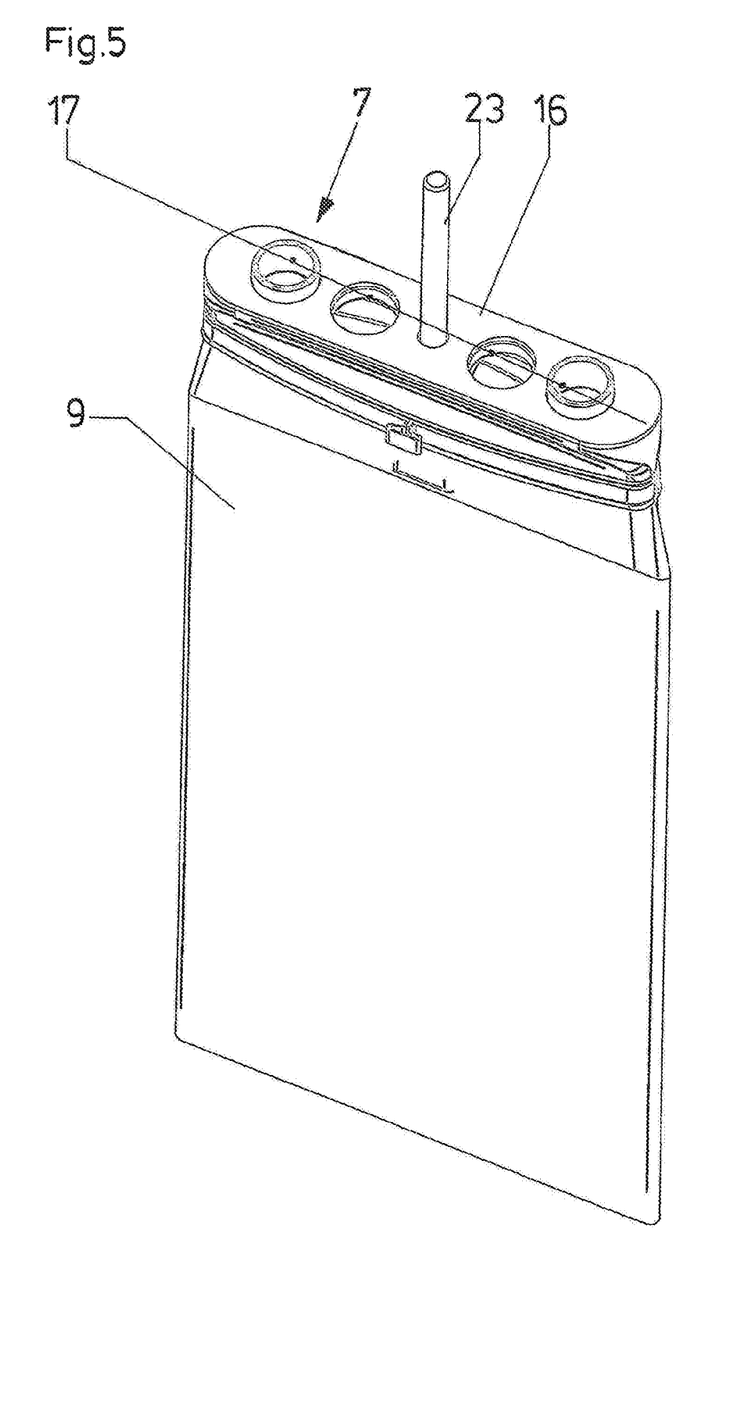
FIG. 5 is a side view from above of a filter element according to the invention.
Figure 6:
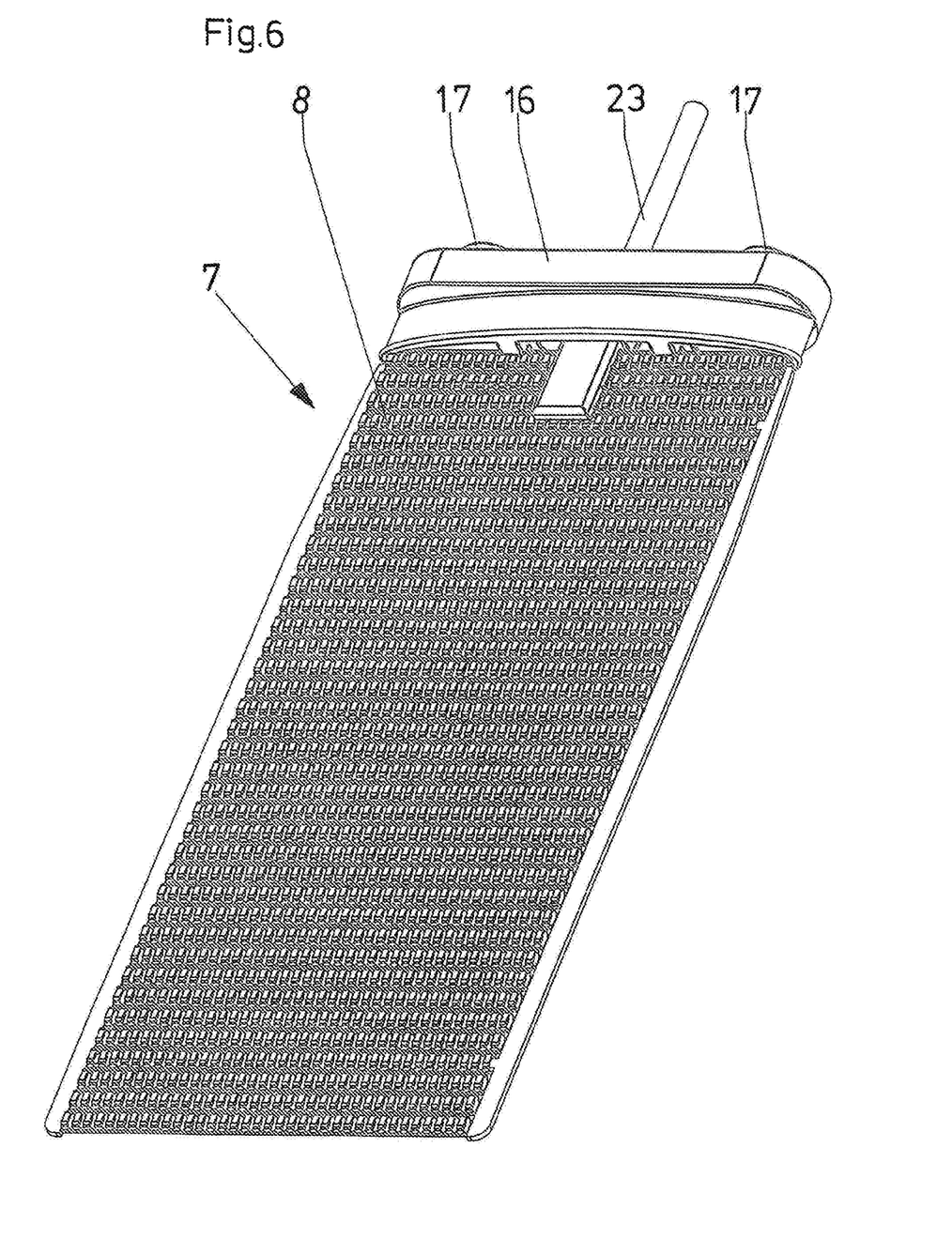
FIG. 6 is a view of a filter element from below and without its filter cloth.
Figure 10:
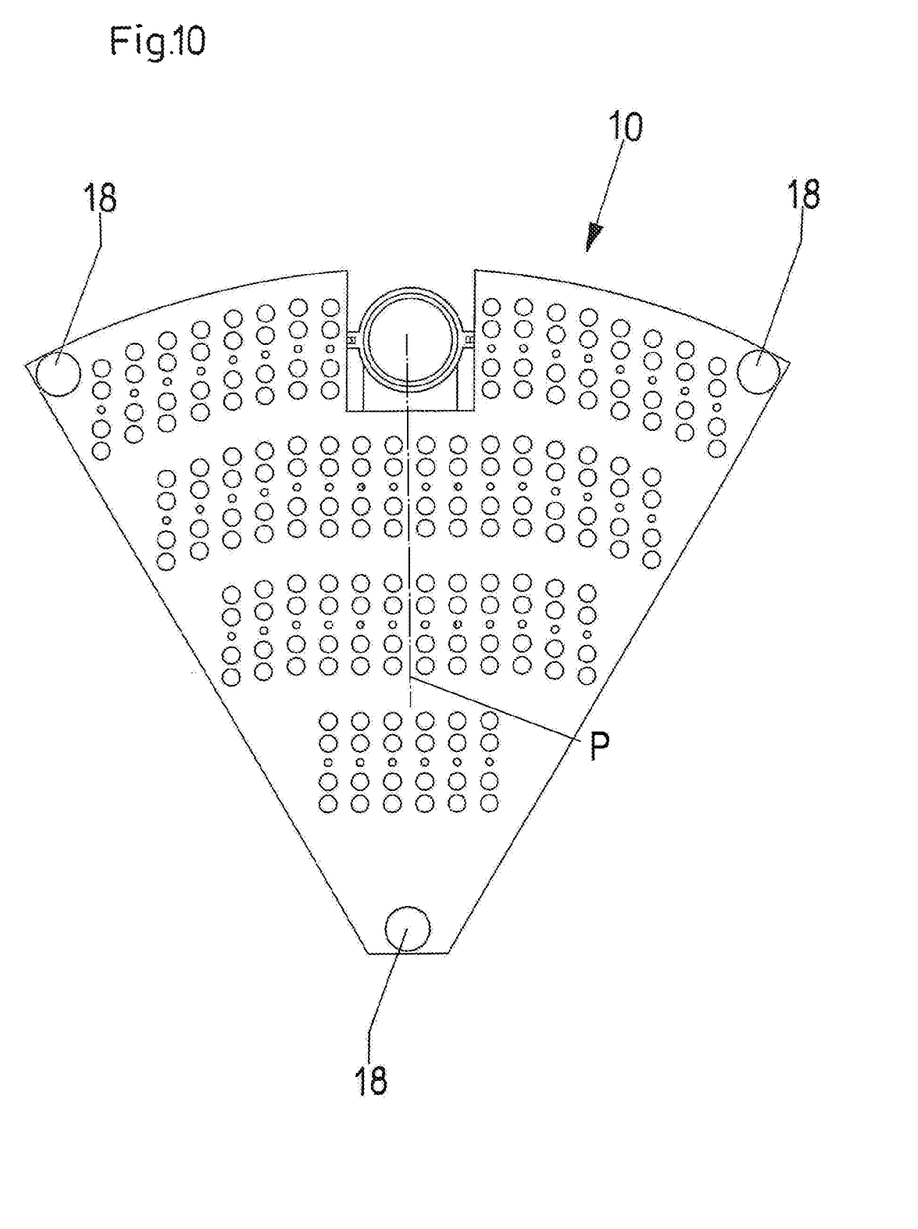
FIG. 10 is a view like FIG. 9 but without the filter elements.

The longitudinal broad side faces of the filter elements 7 of each holder 10 extend parallel to a respective radial central plane P (see FIGS. 4 and 10) bisecting the respective segmental filter holder 10.

In this embodiment, the filter apparatus 1 has six pie-shaped segmental filter holders 10 that together form a circular insert. Alternatively and not shown in the figures, it is also possible to provide four, eight, ten or twelve segmental filter holders that together form such a circular insert.

Here, each segmental filter holder 10 has four parallel rows of filter elements 7. The radial outermost first row and the second row disposed next to it each have sixteen filter elements 7 disposed in parallel to one another, the third row has twelve filter elements and the fourth row close to the center has six filter elements disposed in parallel. The outermost row is interrupted by a radially outwardly open notch in the holder 10 through which the pipe connection 24 from the respective chamber 11 to the ring pipe 13 extends.

The inlet 3 is formed by a pipe that passes through the housing wall beneath the segmental filter holder 10 and opens at 15 centrally in the cylindrical part 14 of the housing 2 just below the segmental filter holder 10. An especially uniform distribution of the suspension among all the filter elements 7 situated in the filter housing 2 is made possible in this way.

According to the invention, each filter element 7 has an approximately rectangular shape and consists of an end piece 16 and a double-slotted metal plate fixed to the end piece 16 and forming the filter support 8. The double-slotted metal plate forming the filter support 8 is designed to be flat and flexible and is covered by a sock forming the filter cloth 9.

For outflow of the filtrate flowing upward along the filter support 8, the end piece 16 has outflow connections 17 for the filtrate, directed upward into the filter holder 10 and opening into it. In this way, the filtrate can be removed from the respective filter element 7 through its holder 16 and into the inlet chamber 11 of the segmental filter holder 10. For a particularly fast, easy and correctly positioned assembly and dismantling of the individual segmental filter holders 10 on the housing 2, each segmental filter holder 10 has support elements running approximately parallel to the filter elements 7, namely support rods 18 in this embodiment. The support rods 18 are supported in the installed position on corresponding support areas 19 forming axially extending guides on the inside of the housing and on the outlet region 15 of the inlet pipe 3 whose outlet 15 is centered on the axis A, and are guided in the correct position on them in this embodiment. This permits a simple and easy removal and insertion of individual segmental filter holders 10 always in the proper position.

The segmental filter holders 10 each have an approximately triangular shape. The support elements formed by the support rods 18 extend in the corners of the triangle. For a particularly rapid and simple monitoring of the filter performance and/or filter quality, an inspection window 20 is provided in each of the pipe connection 24 extending between the outflow fitting 12 of the segmental filter holder 10 and the ring pipe 13 running peripherally around the cylindrical part 14 of the housing 2. This inspection window 20 permits a rapid assessment of the degree of turbidity of the filtrate by simple observation on the part of an experienced operator. For example, if the degree of turbidity of a segmental filter holder 10 has a so-called turbid flow then the observer can immediately stop operation of this specific segmental filter holder 10. To do so, a cutoff valve 21 is disposed in the pipe connection 24 close to the inspection window, both being between the outflow fitting 12 of the segmental filter holder 10 and the ring pipe 13 running peripherally on the outside around the cylindrical part 14 of the housing 2 in the region outside of the housing 2. This permits rapid and simple shutdown and, if necessary, resumption of operation of a single segmental filter holder 10.

Figure 1:
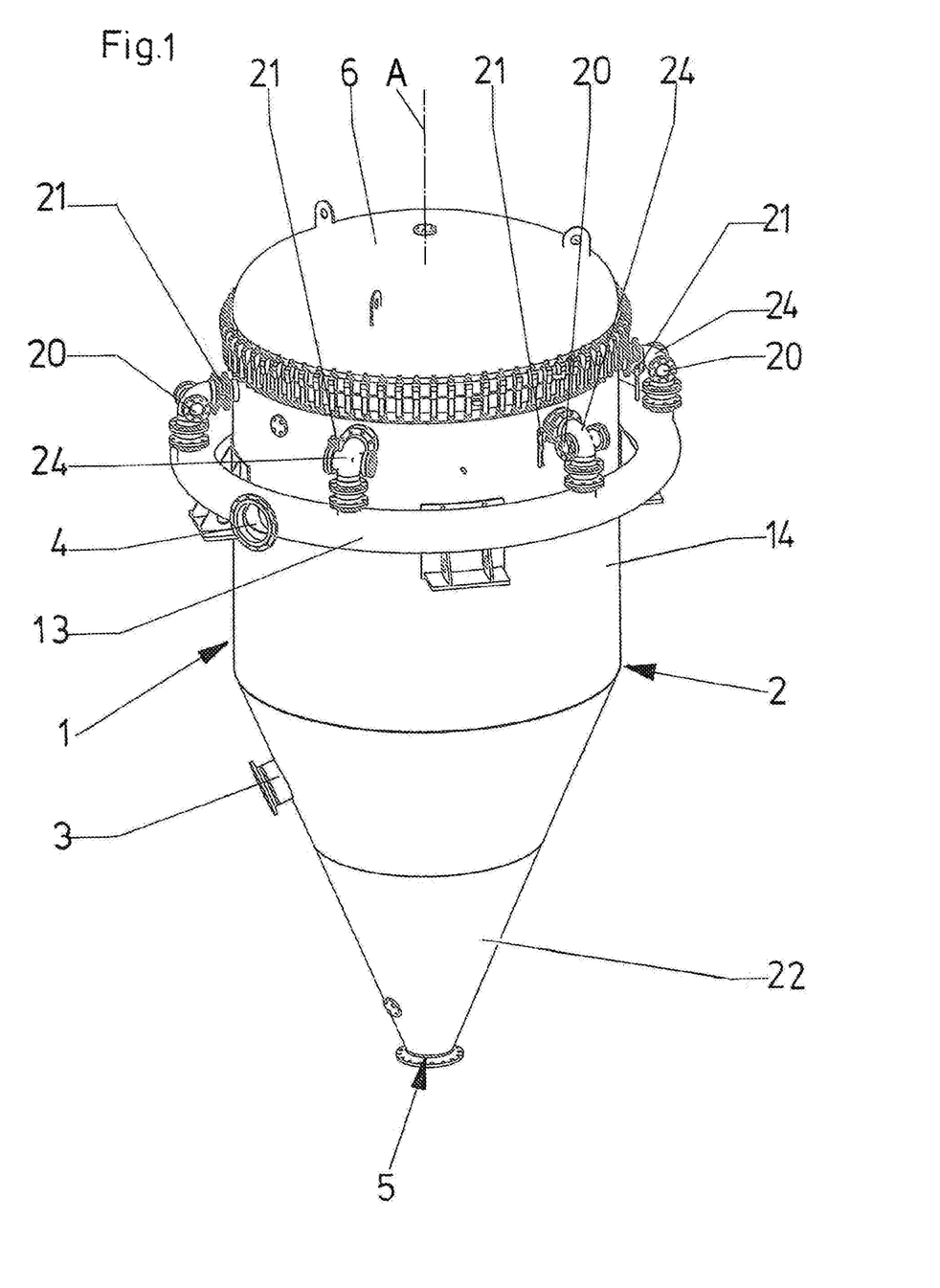
FIG. 1 is a side view from above of a filter apparatus according to the invention in fully assembled condition.
Figure 2:
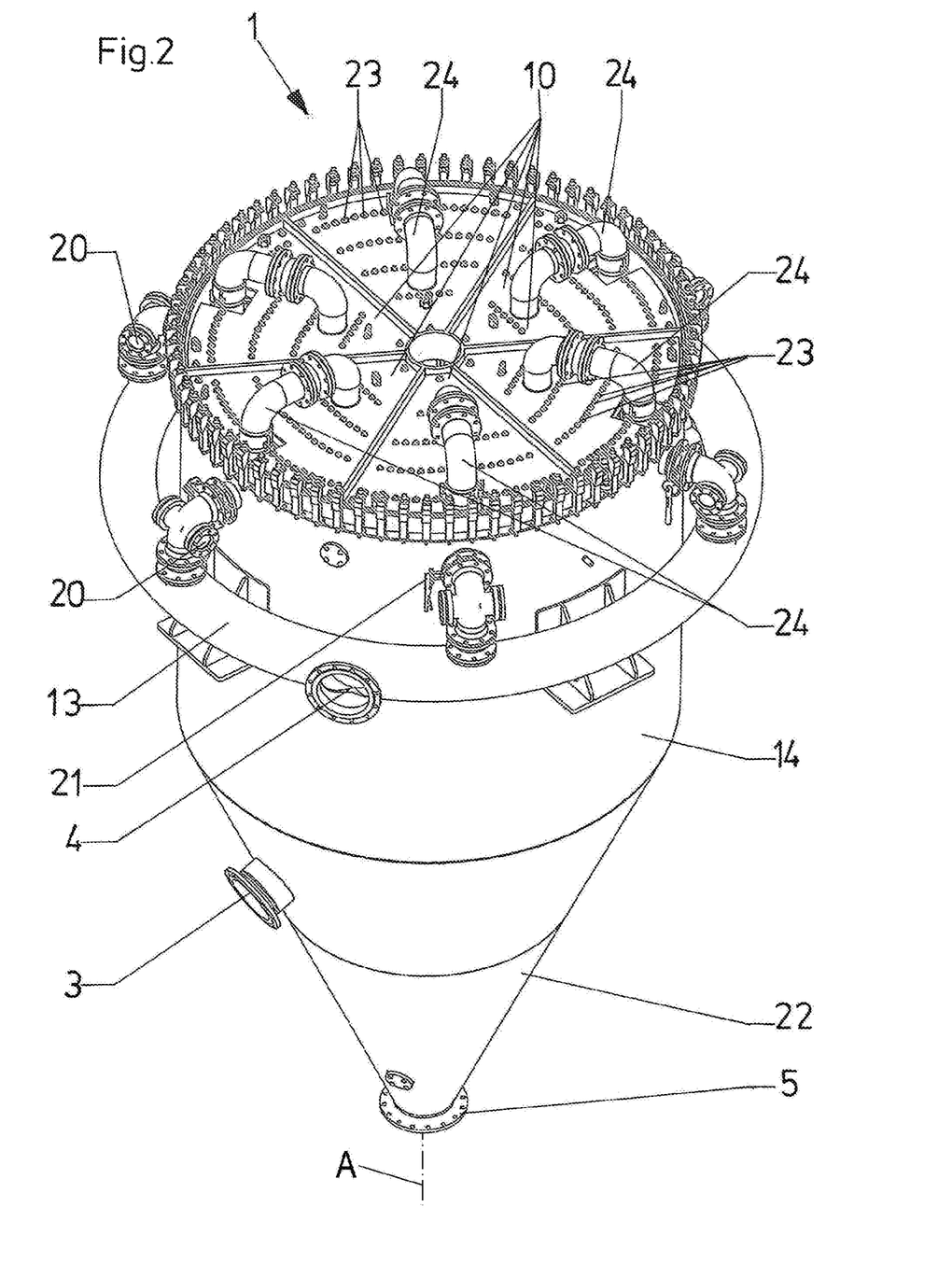
FIG. 2 is a view like FIG. 1 but with the housing's cover removed.
Figure 3:
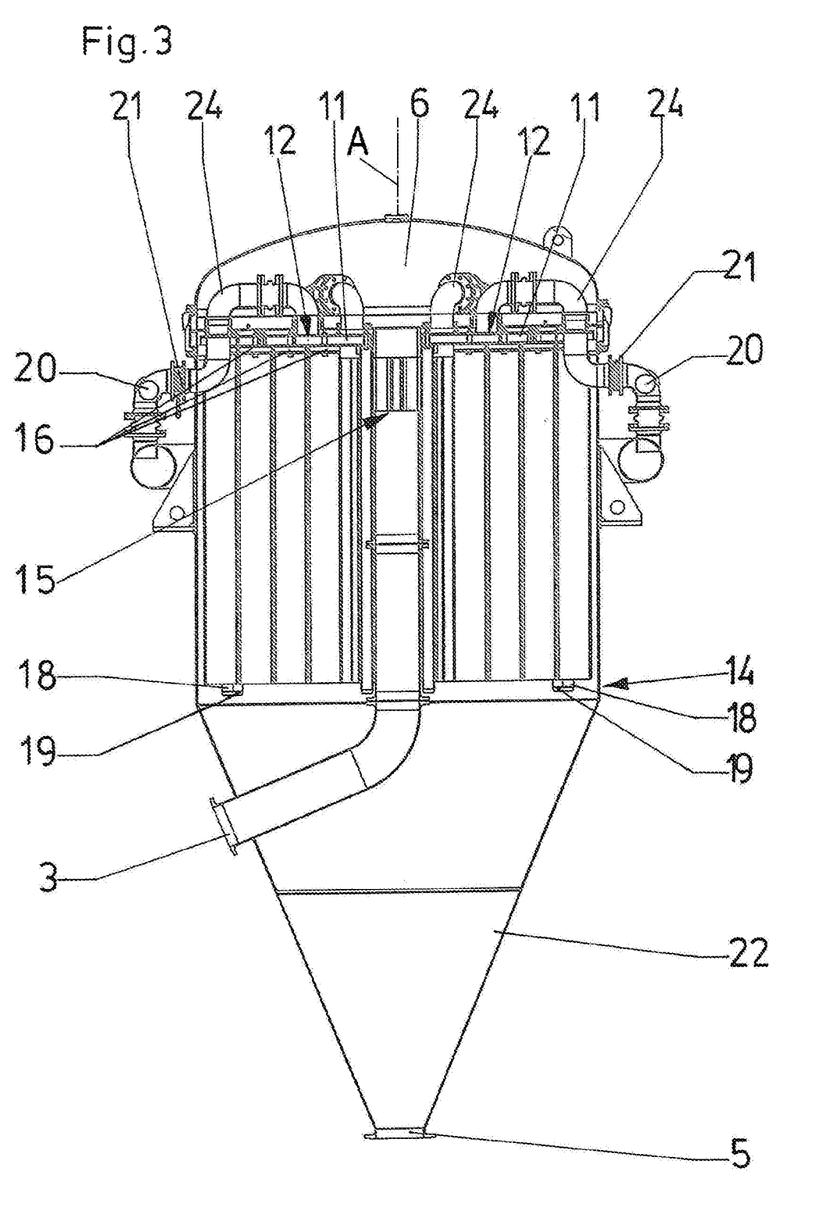
FIG. 3 is an axial section through the fully assembled filter apparatus of the invention.

As shown by FIGS. 1 to 3 in particular, the housing 2 is has a lower funnel-shaped part 22 connecting the lower end of the cylindrical part 14 opposite the cover 6 to the discharge opening 5 at the very bottom end of the housing 1.

Each segmental filter holder 10 has a least one plate that forms the inlet chamber 11. The inlet chamber 11 is designed and serves to receive the filtrate of all the filter elements 7 that are connected to this segmental filter holder 10.

To permit a rapid and easy replacement of individual filter elements 7 on a segmental filter holder 10, the inlet chamber 11 has fastening means passing through it with a seal, namely threaded bolts 23 in this embodiment. The threaded bolts 23 project upward from the end pieces 16 of the filter elements 7 and these threaded bolts 23 pass through corresponding openings in the inlet chamber 11 and can be secured in this position and/or can be screwed in this position by nuts sitting atop the top plate of the holder 10.

Thus to change one or all of the filter elements 8, one first takes off the cover 6, then disconnects the pipe connection 24 to as many of the holders 10 as need to be replaced, swinging the disconnected connections 24 outward so they are no longer above the respective holders 10. Then each holder 10 is simply lifted out and the fasteners 23 are undone for as many of the elements as need to be replaced. One or more new elements 8 are installed in the place of the removed ones, and the entire holder 10 is dropped axially back into place, with sliding of the rod legs 18 in the guides 19. Once a holder 10 is back in place coplanar with the other holder, its pipe connection 24 is swung back in place, pushed down, and locked to the respective fitting 12, then the cover 6 is replaced and the job is done.

The invention is not limited to this embodiment but instead can be varied in a variety of ways within the scope of the disclosure. All the individual features and combined features disclosed in the description and/or drawings are regarded as essential to the invention.

We claim:

1. An apparatus for filtering a suspension, the apparatus comprising:
    a housing having a cylindrical part centered on an axis, an inlet extending through the cylindrical part and receiving the suspension to be filtered, an outlet for extracting clear filtered filtrate, and a drain connected from below to the housing for removal of filter cake;
    a ring pipe connected to the outlet and externally surrounding the cylindrical part;
    a plurality of segmental filter holders fittable into the cylindrical part from above, together forming a circular insert, and each forming an inlet chamber having an outflow fitting connectable to the ring pipe;
    respective sets of filter elements below the respective inlet chambers and each formed by a respective strip-shaped support and mesh filter sock surrounding the support carried on the respective holder and opening into the respective inlet chambers;
    a removable cover upwardly closing the cylindrical part above the holders;
    respective pipe connections each extending from a respective one of the outflow fittings inside the housing below the cover above the respective holder radially outward through the cylindrical part to the ring pipe; and
    a respective slip connection connecting each pipe connection to the outflow fitting of the respective inlet chamber, each of the holders being formed with an axially extending radially open notch aligned with the respective pipe connection such that the holders are each movable upwardly out of the housing with the respective filter elements of the respective set without removal of the pipe connections.

2. The filter apparatus defined in claim 1, wherein each of the holders is pie shaped, the supports of each holder being substantially rectangular and parallel to one another.

3. The filter apparatus defined in claim 2, wherein the supports have side faces that extend parallel to a respective radial central plane through the axis of the housing.

4. The filter apparatus defined in claim 1, wherein there are 4, 5, 8, 10, or 12 such filter elements carried on each of the holders.

5. The filter apparatus defined in claim 1, wherein each holder has four rows of the filter elements disposed side by side including an outermost first row and a second row thereadjacent each having sixteen filter elements disposed parallel to one another, a third row having twelve of the filter elements and a fourth row disposed close to the axis having six of the filter elements.

6. The filter apparatus defined in claim 1, wherein each holder and the respective pipe connection have axially slidably interfitting fittings that, when slid together on installation of the holder in the housing, form a liquid-tight connection.

7. The filter apparatus defined in claim 1, wherein each support is substantially rectangular and is formed by a flat and flexible double-slotted metal plate fixed to the respective holder.

8. The filter apparatus defined in claim 7, wherein each support forms a respective one of the inlet chambers and each filter element has an upwardly projecting fitting opening into the respective inlet chamber.

9. The filter apparatus defined in claim 1, wherein each pipe connection extending from each holder through the housing to the ring pipe is provided outside the housing with a transparent inspection window.

10. The filter apparatus defined in claim 9, wherein each pipe connection is provided with a respective shutoff valve.

11. The filter apparatus defined in claim 1, wherein the housing has a frustoconical and funnel-shaped lower part extending downward from the cylindrical part and having a lower end forming the drain.

12. An apparatus for filtering a suspension, the apparatus comprising:
    a housing with an inlet receiving the suspension to be filtered, an outlet for clear filtered filtrate, and a drain for removal of filter cake, the housing having a cylindrical part centered on an axis;
    a removable cover upwardly closing the cylindrical part;
    a ring pipe connected to the outlet below the cover through an upper region of the cylindrical part and externally surrounding the cylindrical part;
    a plurality of segmental filter holders fittable into the cylindrical part below the cover from above, together forming a circular insert, and each forming an inlet chamber having an outflow fitting connectable to the ring pipe;
    a plurality of axially extending rods projecting downward from the respective holder;
    respective axially extending guides for the rods formed in the housing and oriented to receive the rods of the holders; and
    respective sets of filter elements each formed by a respective strip-shaped support and mesh filter sock surrounding the support carried on the holder and opening into the respective inlet chambers.

13. The filter apparatus defined in claim 12, further comprising:
    a respective pipe connection extending from each of the holders above the holders and below the cover and down through the holders and out through the cylindrical part of the housing below the housing to the ring pipe.

14. The filter apparatus defined in claim 12, wherein the holders are, seen from above, generally triangular and the rods are in corners of the respective holders.

15. The filter apparatus defined in claim 12, wherein each holder is formed by a respective plate forming the respective inlet chamber connected to the ring pipe and into which the respective filter elements open.

16. The filter apparatus defined in claim 15, wherein each plate is provided with a fastener bolt for removably securing the filter element to the holder.

* * * * *